(12) United States Patent
Migdal et al.

(10) Patent No.: US 6,392,655 B1
(45) Date of Patent: May 21, 2002

(54) FINE GRAIN MULTI-PASS FOR MULTIPLE TEXTURE RENDERING

(75) Inventors: Christopher J. Migdal; Amy J. Migdal; David L. Morgan, all of Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/306,987

(22) Filed: May 7, 1999

(51) Int. Cl.$^7$ .............................................. G06T 11/40
(52) U.S. Cl. ........................ 345/582; 345/583; 345/584
(58) Field of Search .................................. 345/430, 431, 345/422, 423, 513, 429, 418, 424, 425, 582, 589, 629; 382/285, 276, 265

(56) References Cited

U.S. PATENT DOCUMENTS

| | | | |
|---|---|---|---|
| 5,307,450 A | * 4/1994 | Grossman | 345/423 |
| 5,740,343 A |   4/1998 | Tarolli et al. | 395/130 |
| 5,760,783 A | * 6/1998 | Migdal et al. | 345/430 |
| 5,831,624 A | * 11/1998 | Tarolli et al. | 345/430 |
| 5,844,571 A | * 12/1998 | Narayanaswami | 345/422 |
| 6,005,582 A | * 12/1999 | Gabriel et al. | 345/430 |
| 6,104,415 A | * 8/2000 | Gossett | 345/513 |

OTHER PUBLICATIONS

Foley et al., *Computer Graphics: Principles and Practice*, Second Edition, 1990, Addison–Wesley Publishing, pp. xvi-i–xxiii and 855–922.

Montrym, J.S. et al., "InfiniteReality: A Real–Time Graphics System," Computer Graphics Proceedings, Annual Conference Series, 1997, pp. 293–302.

Woo, M. et al., *OpenGL® Programming Guide: The Official Guide to Learning OpenGL*, Version 1.1, Second Edition, 1997, Silicon Graphics, Inc., Entire book provided.

\* cited by examiner

*Primary Examiner*—Michael Razavi
*Assistant Examiner*—Thu-Thao Havan
(74) *Attorney, Agent, or Firm*—Woodcock Washburn LLP

(57) ABSTRACT

A system and method for multiple texture rendering on a primitive using a fine grain multi-pass at a pixel level. The present invention has hardware capable of processing one texture and either hardware, software, and/or firmware capability to hold state information associated with several textures. The hardware rapidly switches between processing different textures and allows a very fine grain multi-pass implementation of multiple texture rendering. In one embodiment, a computer graphics raster subsystem renders multiple textures on a primitive. A fine grain scan converter takes in a primitive description with multiple sets of texture coordinates defined for each vertex. Each set of texture coordinates defines an independent texture. Each texture is associated with a texture number. The fine grain scan converter produces a set of texture coordinates at a given pixel for each of the multiple textures before moving on to the next pixel. A texture address generator and texture filter use the texture numbers and the texture coordinates associated with the texture numbers to produce a filtered texture value for each of the multiple textures. A recirculating texture blender combines color and these filtered texture values to produce a final textured color value. The fine-grain multi-pass technique for rendering multiple textures on a primitive is faster than a coarse grain multi-pass technique because the geometry does not need to be sent multiple times from a geometry engine to a raster subsystem. In addition, the fine-grain multi-pass technique is cheaper and more efficient than a parallel approach because it does not require permanent multiple texture units in a hardware connected together by texture blending units.

22 Claims, 12 Drawing Sheets

FINE GRAIN MULTI-PASS FOR MULTIPLE TEXTURE RENDERING

BACKGROUND OF THE INVENTION

1. Field of the Invention

The present invention pertains to the field of computer graphics, and in particular, to multiple texture rendering.

2. Related Art

Computer systems are commonly used for displaying graphical objects on a display screen. These graphical objects include points, lines, polygons, and three dimensional solid objects. By utilizing texture mapping techniques, color and other details can be applied to areas and surfaces of these objects. In texture mapping, a pattern image, also referred to as a "texture map," is combined with an area or surface of an object to produce a modified object with the added texture detail. For example, given the outline of a featureless cube and a texture map defining a wood grain pattern, texture mapping techniques can be used to "map" the wood grain pattern onto the cube. The resulting display is that of a cube that appears to be made of wood. In another example, vegetation and trees can be added by texture mapping to an otherwise barren terrain model. Likewise, labels can be applied onto packages or cans to visually convey the appearance of an actual product. Textures mapped onto geometric surfaces provide motion and spatial cues that surface shading alone might not provide. For example, a sphere rotating about its center appears static until an irregular texture or pattern is affixed to its surface.

Multiple texture rendering techniques are used to render multiple textures on a single primitive. Many complex computer graphics effects are implemented by rendering multiple textures on a primitive and blending these textures together. One method of multiple texture rendering is to do a "coarse" grain multi-pass. Each texture is handled in succession by a single texture processing hardware unit. A coarse grain multi-pass process first renders all of the primitives of an object for a single texture, and then renders the object with the next texture, until all textures are complete. Blending between textures is limited to frame buffer operations. The coarse grain multi-pass technique requires geometry to be sent multiple times from a geometry engine to a raster subsystem. Therefore, a coarse grain multi-pass technique is slow and involves considerable overhead. On the other hand, a coarse grain multi-pass technique requires only one texture processing hardware unit.

A second multiple texture rendering technique, which is now just appearing on personal computer (PC) level products, is to have multiple texture units in the hardware connected together by texture blending units. This parallel approach to multiple texture rendering has the advantage of being able to render multiple textures simultaneously, thereby, completing the multiple textures in one pass. See, for example, U.S. Pat. No. 5,740,343 issued to Tarolli et al. Tarolli combines multiples textures in a single pass using a texture compositing unit (TCU) 114. However, TCU 114 uses a cascade of multiple copies of texture mapping units (TMUs) 210A-C (FIG. 2 and col. 7, lns. 24–27). This technique has the disadvantage of being expensive because multiple copies of the texture unit hardware (TMUs) are required to render multiple textures in a single pixel rendering pass. This technique has the further disadvantage that if multiple textures are not being used, the additional copies of texture hardware are not used.

A multiple texture rendering technique is needed that is faster than coarse grain multiple texture rendering and less expensive than a parallel approach using multiple redundant copies of texture hardware.

SUMMARY OF THE INVENTION

The present invention provides a system and method for multiple texture rendering on a primitive using a fine grain multi-pass at a pixel level. In one embodiment, a computer graphics raster subsystem renders multiple textures on a primitive. A fine grain scan converter takes in a primitive description with one color and multiple sets of texture coordinates defined for each vertex. Each set of texture coordinates defines an independent texture. Each texture is associated with a texture number. The fine grain scan converter produces fragments. Each fragment corresponds to a single pixel and includes color and a set of texture coordinates for each of the multiple textures. Each fragment can also include other information such as screen position and depth. A texture address generator and texture filter use the texture numbers and their associated texture coordinates to produce a filtered texture value for each of the multiple textures. For multiple textures there will be two or more texture values. Of course, the hardware can handle the case where there is only one or even no texture values. A recirculating texture blender combines these filtered texture values with the fragment color to produce a final textured fragment color. The recirculating texture blender can also output intermediate results in producing the-textured fragment color.

According to one embodiment of the present invention, the fine grain scan converter has a scan converter, a fragment color calculator, a replicator, and a texture coordinate calculator. The scan converter produces one position per pixel. The fragment color calculator calculates a color per pixel from the vertex colors and the pixel position. The replicator makes multiple copies of the pixel position information. The number of copies corresponds to the number of textures. The replicator assigns each copy a unique texture number. The texture coordinate calculator calculates texture coordinates in texture space from the vertex texture coordinates and the pixel position.

The texture memory address generator accesses texels identified by the texture coordinates output from the fine grain scan converter. The texture filtering block (also called a texture filter) filters texels output from the texture memory address generator to produce a single filtered texture value associated with a texture number being processed. The recirculating texture blender combines a color and multiple filtered textures to yield a single textured fragment color value. The recirculating texture blender can also pass texture information to other blocks in a graphics subsystem, such as a lighting block.

One feature of the present invention is that a single texture processing hardware unit can be used to perform multiple texture rendering on a primitive in a fine grain multi-pass on a pixel level. In one preferred embodiment, each of the texture coordinate calculator in a fine grain scan converter, the texture address generator, the texture filter, and the recirculating texture blender comprise stages of a single texture processing hardware unit. The single texture processing hardware unit includes hardware capable of processing one texture and either hardware, software, and/or firmware capability to hold state information associated with several textures. The hardware rapidly switches between processing different textures and allows a very fine grain multi-pass implementation of multiple texture rendering.

In one example implementation, the single texture processing hardware unit includes a texture processing unit, a texture state register, a texture enablement register, and a switch or multiplexer (switch/multiplexer). The texture processing unit performs texture processing including the stages of texture coordinate calculation, texture address generation, texture filtering, and recirculating texture blending. The texture state register stores state information associated with each texture during the texture processing. The texture enablement register stores information identifying whether each texture is enabled. The switch or multiplexer selects which enabled texture is to be processed by the texture processing unit based on a received texture number and the texture enablement register.

A method of the present invention comprises the steps of (a) storing state information associated with each of multiple textures in texture state registers; (b) storing enablement information in texture enablement registers identifying whether each multiple texture is enabled; (c) assigning texture numbers identifying textures; (d) at stages of multiple texture rendering, switching to couple a texture processing unit to a texture state register corresponding to a texture identified by a texture number assigned in the step (c); and (e) processing each texture based on state information in the texture state register when the texture enablement register identifies an enabled texture. Steps (d) and (e) are repeated until all of the assigned texture numbers in step (c) have been received and all enabled textures have been processed in rendering the primitive.

In one example, the texture processing step (e) includes stages of multiple texture rendering comprising steps of texture coordinate calculation in fine grain scan converting, texture addressing, texture filtering, and recirculating texture blending. In fine grain scan converting, the primitive defined by the input vertices is rasterized to fragments such that for each pixel is produced the required texture coordinates for each of the multiple textures along with their corresponding texture numbers. The resulting texture coordinates are rendered through texture addressing and texture filtering steps into filtered texture values for each of the multiple textures. The recirculating texture blending step combines these multiple textures with a base fragment color to produce a final color.

A fine-grain multi-pass technique for rendering multiple textures on a primitive, as in the present invention, is faster than a coarse grain multi-pass technique because the geometry does not need to be sent multiple times from a geometry engine to a raster subsystem. In addition, the fine-grain multi-pass technique of the present invention is cheaper and more efficient than a parallel approach because it does not require multiple dedicated texture units in hardware connected together by multiple dedicated texture blending units.

Further embodiments, features, and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings.

Figure 1:
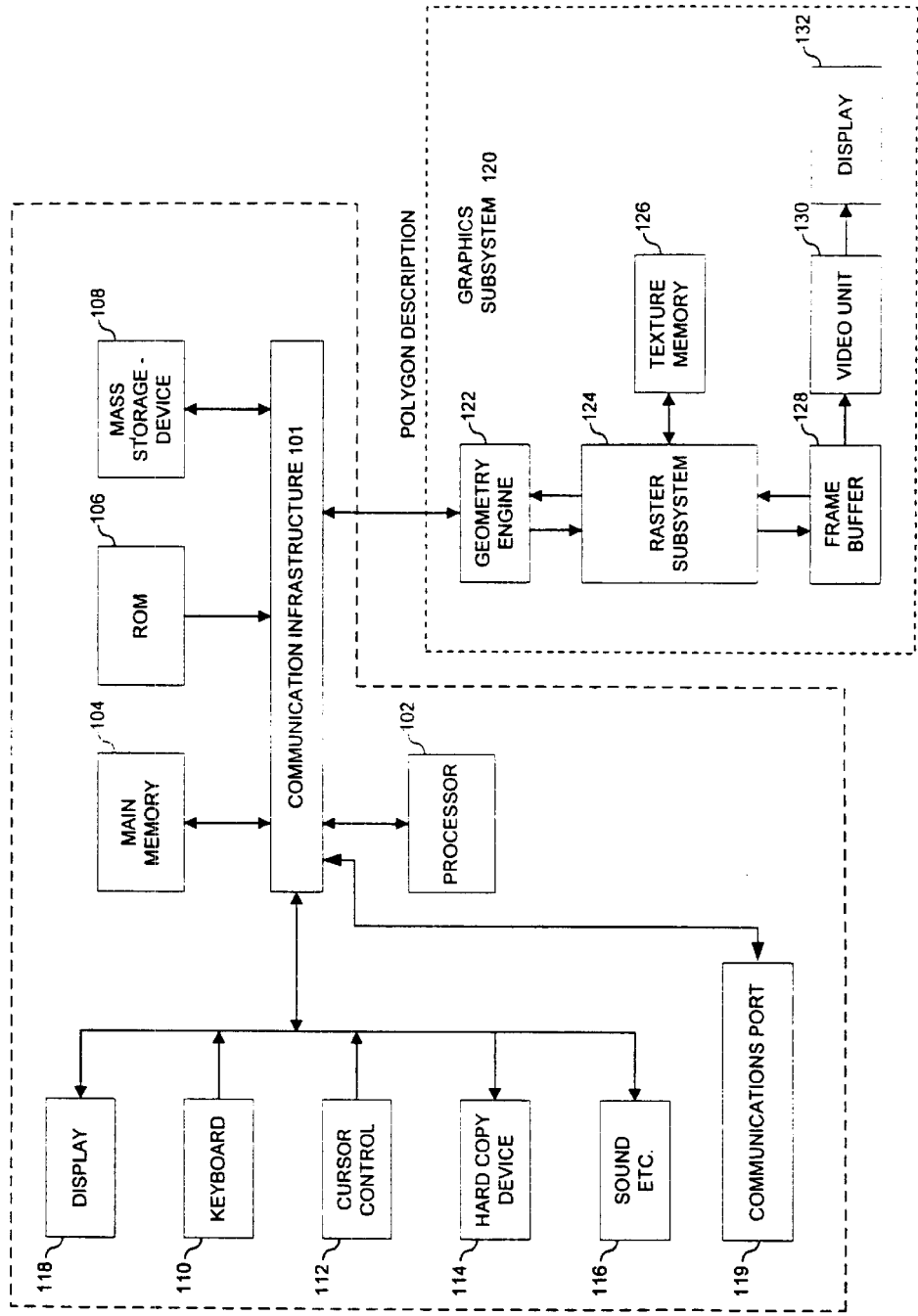
FIG. 1 is a block diagram of an example computer graphics system implementing the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Table of Contents

I. Overview
II. Terminology
III. Example Environment
IV. Fine Grain Multi-Pass in Multiple Texture Rendering
   A. Architecture
      1. Raster Subsystem
      2. Multi-State Pipeline
      3. Example Fine Grain Scan Converter
      4. Example Recirculating Texture Blender
   B. Operation
   C. Initialization
   D. Multiple Texture Rendering on a Single Primitive
   E. Texture Processing
      1. Recirculating Texture Blending
         a. Fine Grain Pass One
         b. Fine Grain Pass Two
         c. Fine Grain Pass Three
         d. Fine Grain Pass Four
   F. Example Implementation
      a. Texture Input Flow Control
      b. Multiple Textures
      c. Texture Environment
      d. Programming Note
V. Conclusion

DETAILED DESCRIPTION OF THE PREFERRED EMBODIMENTS

I. Overview

The present invention provides a system and method that performs multiple texture rendering through a fine grain multi-pass technique. Fine grain multi-passing of multiple textures during a single pixel level rendering pass is performed to render multiple textures on a primitive. Texture state storage (e.g., registers) is used to hold current state information for multiple textures. Only one texture processing hardware unit is used. Multiple dedicated texture processing hardware units are not necessary. Further, the texture state storage costs far less hardware than extra texture processing hardware units.

The texture processing hardware unit is multiplexed over time to perform a fine grain multi-pass in the rendering of multiple textures. The texture processing hardware unit switches to process multiple textures rapidly over time. For example, during a pipelined texture processing, the texture processing hardware unit can allocate one clock interval for each texture. The texture processing hardware unit then takes one clock interval to process a single texture, two clocks to process two textures, three clocks to process three textures, four clocks to process four textures, and so on until the limits of its texture state storage is reached.

In one embodiment, a single multi-state texture processing pipeline comprises a texture processing unit, state registers, and a switch or multiplexer. The texture processor performs texture coordinate calculation in fine grain scan conversion, texture address generation, texture filtering, and recirculating texture blending. The state registers hold state information associated with the multiple textures. The state information tracks the state of each of the multiple textures being rendered during pipelined texture processing. At each stage of texture processing in a fine grain multi-pass, the texture processing hardware unit receives a texture number (texnum). The texture number identifies one of the multiple textures (i.e., the current texture) to be processed. The texture processing hardware unit then processes the texture identified by the texture number based on the state information corresponding to the current texture held in the state registers. The texture numbers for other remaining textures are fed in to the texture processing hardware unit during pipelined processing stages to complete multiple texture rendering on a primitive. For example, in the case four textures are rendered, texnums 0 to 3 are used in four clock cycles of the texture processing hardware unit. After the above multi-state texture rendering pipeline is complete, texture data and texture numbers (texnums) are output along with the textured fragment color for blending and further shading, lighting, and/or coloring processing.

According to a further feature of the present invention, recirculation is used in the texture blending part of texture processing. In particular, fragment color and intermediate results are recirculated through a single texture environment processing stage. This recirculation proceeds until all texture data output from the texture filter is combined into a final textured fragment color. Only one texture processing environment (software and hardware) is used for blending. Multiple texture processing environments for blending are not necessary. Intermediate results storage (e.g., buffers) is added to support recirculation. However, the hardware costs of intermediate results storage are far less than extra texture processing environment hardware for blending.

II. Terminology

To more clearly delineate the present invention, an effort is made throughout the specification to adhere to the following term definitions as consistently as possible.

The term "primitive" refers to any point, line, polygon, bitmap, image, object, or part of an object that is to be rendered. "Fragments" are entities generated by the rasterization of primitives. Each fragment corresponds to a pixel and includes color, texture coordinates, and/or other values, such as depth and screen position.

The term "texture" is used broadly to refer to any image. The image can be one-dimensional or multi-dimensional (e.g., a two-dimensional texture, a three-dimensional texture, or a greater than three-dimensional texture). The image can be any shape in texture space including, but not limited to, rectangular arrays of texels.

The term "texture processing hardware unit" as used herein refers to texture hardware capable of processing approximately one texture at a time. Texture processing is the process of applying a texture to a primitive (or fragment). During such texture processing, a texture is used to modify the color of fragments produced by the rasterization of primitives. Texture processing (also called texture rendering or texture mapping) includes one or more of the following operations: texture coordinate calculation, texture addressing, texture filtering, and texture blending. Texture addressing takes in a texture coordinate at a pixel, generates a texture memory address, and retrieves the texel sample(s) associated with that texture coordinate. Texture filtering is the process of filtering multiple texels to produce a single texture value. Texture blending is the process of blending the texture values from multiple textures and a fragment color to obtain a final textured fragment color.

"Fine grain multi-pass" as used herein refers to the process according to the present invention of switching one texture processing hardware unit to multiplex the rendering of multiple textures during a pixel-level rendering pass over time. "Pixel-level rendering pass" refers to a single pixel, pixel pair, pixel quad or other combination of pixels used in a single rendering pass. "Recirculating" as used herein refers to the process according to the present invention of recirculating intermediate results through a single texture environment processing stage. The single texture environment processing stage can include software and hardware.

III. Example Environment

The present invention is described with reference to an example computer graphics environment. Referring to FIG. 1, a block diagram of a computer graphics display system 100 is shown. System 100 drives a graphics subsystem 120 for generating textured display images according to the present invention.

System 100 includes a host processor 102 coupled through a data bus 101 to a main memory 104, read only memory (ROM) 106, and mass storage device 108. Mass storage device 108 is used to store vast amounts of digital data relatively cheaply. For example, the mass storage device 108 can consist of one or more hard disk drives, floppy disk drives, optical disk drives, tape drives, CD ROM drives, or any number of other types of storage devices having media for storing data digitally.

Different types of input and/or output (I/O) devices are also coupled to processor 102 for the benefit of an interactive user. An alphanumeric keyboard 110 and a cursor control device 112 (e.g., a mouse, trackball, joystick, etc.) are used to input commands and information. The output devices include a hard copy device 114 (e.g., a laser printer) for printing data or other information onto a tangible medium. A sound recording or video option 116 and a display screen 118 can be coupled to the system 100 to provide for multimedia capabilities. A communications port 119 (e.g., an internal or external modem) can couple the system through a communication link to a network, such as, a local area network and/or wide area network.

Graphics data (i.e. a polygonal description of a display image or scene) is provided from processor 102 through communication infrastructure 101 (e.g., one or more buses) to the graphics subsystem 120. Alternatively, as would be apparent to one skilled in the art, at least some of the functionality of generating a polygonal description could be transferred to the computer graphics subsystem as desired. Processor 102 also passes texture data for multiple textures from mass storage device 108 to texture memory 126.

The graphics subsystem 120 includes a geometry engine 122, a raster subsystem 124 coupled to a texture memory 126, a frame buffer 128, video unit 130, and display 132. Processor 102 provides the geometry engine 122 with a polygonal description of a display image in object space. The geometry engine 122 essentially transforms the polygonal description of the image (and the objects displayed therein) from object space (also known as world or global space) into screen space. For example, primitives defined by vertices are output from geometry engine 122. In one preferred example, a primitive can be a triangle having three vertices. Position information and color is associated with each vertex. Other types of primitives which can be used include a point, line, polygon in 2D or 3D, or polyhedra or free-form surface in 3D, bitmap or image.

Raster subsystem 124 rasterizes the primitives to fragments and maps texture data from texture memory 126 to the fragments to obtain pixel data. The pixel data is eventually filtered, accumulated, and stored in frame buffer 128. Raster subsystem 124 further supports fine-grain multi-pass in multiple texture rendering according to the present invention as described herein and further with respect to FIGS. 2–8D.

Depth comparison and other display processing techniques can be performed in either the raster subsystem 124 or the frame buffer 128. Video unit 130 reads the combined texture and pixel data from the frame buffer 128 and outputs data for a textured image to screen display 132. Of course, as would be apparent to one skilled in the art, the output image can be displayed on display 118, in addition to or instead of display 132. The digital data representing the output textured display image can also be saved, transmitted over a network, or sent to other applications.

The present invention is described in terms of this example computer graphics system environment. However, given the description herein, it would be readily apparent to one skilled in the art how to implement the present invention in any computer graphics application, application programming interface (including, but not limited to, an OPENGL graphics API architecture), platform, or system including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). For example, the present invention can be implemented as a modification on an INFINITE REALITY, OCTANE, or $O_2$ graphics workstation manufactured by Silicon Graphics, Inc. See, e.g., "InfiniteReality: A Real-Time Graphics System," *Computer Graphics Proceedings, Annual Conference Series*, 1997, pp. 293–302 (incorporated herein by reference). Alternatively, the present invention can be combined with or substituted for the texture compositing apparatus described in the above-referenced Tarolli et al. patent and in any machine using a graphics engine designed by 3Dfx Interactive, Inc. of Mountain View, Calif.. Other examples of graphics engines the present invention can be used in include the graphics engines by ARtX and Nvidia. Other raster graphics architectures can be used such as those described in Foley et al., *Computer Graphics*, Addison-Wesley Publishers, U.S.A. (1996), chapter 18, pp. 855–922 (incorporated herein by reference).

Description in these terms is provided for convenience only. It is not intended that the invention be limited to application in this example environment. In fact, after reading the following description, it will become apparent to a person skilled in the relevant art how to implement the invention in alternative environments.

Note an OPENGL™ graphics API architecture does not require use of the present invention. In other words, an OPENGL™ graphics API architecture can operate without using the advantages of the present invention as described herein.

Figure 2:
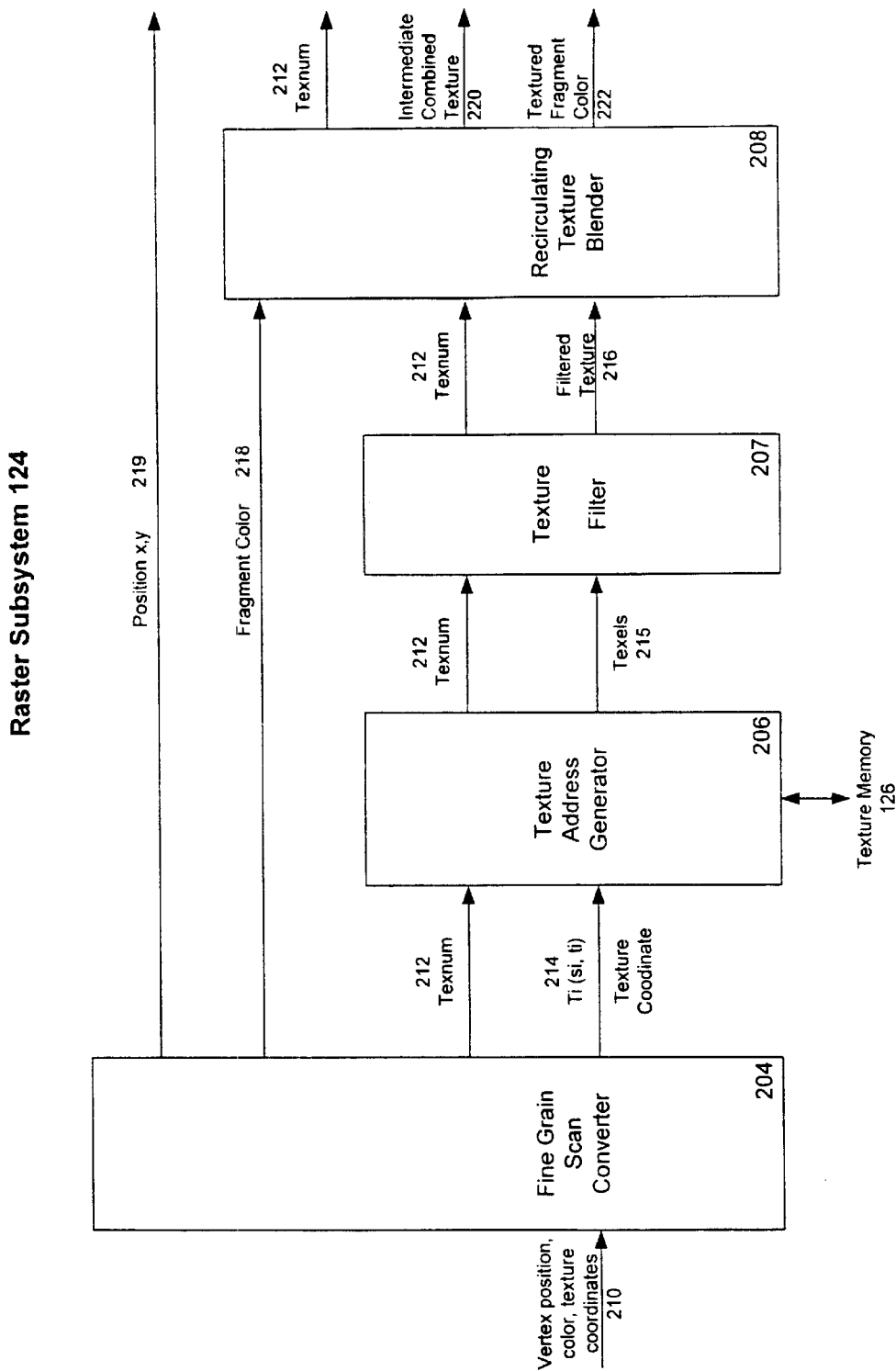
FIG. 2 is a block diagram of an example raster subsystem for multiple texture rendering in a fine grain multi-pass according to one embodiment of the present invention.

IV. Fine Grain Multi-Pass in Multiple Texture Rendering
A. Architecture
1. Raster Subsystem FIG. 2 is a block diagram of a raster subsystem 124 according to one embodiment of the present invention. In one example implementation, raster subsystem 124 can be coupled between geometry engine 122 and frame buffer 128 as described above with respect to FIG. 1. Raster subsystem 124 can also access texel data of multiple textures in texture memory 126.

Raster subsystem 124 includes a fine grain scan converter 204, a texture address generator 206, texture filter 207, and a recirculating texture blender 208. Fine grain scan converter 204, also referred to as a rasterizer, receives vertices of polygons. Fine grain scan converter 204 converts vertices that define the endpoints of primitives into fragments. Scan conversion may be performed by software run by a microprocessor central processing unit (CPU) or by special-purpose hardware such as a coprocessor or accelerator chips.

Fine grain scan converter 204 produces fragment position 219, fragment color 218, texture number (texnum) data 212, and texture coordinate data 214. The pixel or fragment position coordinates 219 identify the picture element that will display the resulting image from the fragment being processed. Fragment color 218 is the underlying primitive color before texture is applied. Texture number (texnum) data 212 identifies by number which texture coordinate Ti 214 (e.g. si, ti, ri in a three-dimensional texture space) is currently being processed. For example, texnum 0 corresponds to the first texture and its coordinates T0, and texnum 1 corresponds to the second texture and its coordinates, T1. Fine grain scan converter 204 will be described in further detail with respect to FIG. 4.

Texture address generator 206 receives texnum data 212 and texture coordinate data 214, accesses texture memory 126, and outputs corresponding texnum data 212 and texel data 215. Texture filter 207 receives texnum data 212 and texel data 215 and outputs corresponding texnum data 212 and filtered texture data 216.

Recirculating texture blender 208 combines textures and/or fragment color. Recirculating texture blender 208 receives texnum data 212 and filtered texture data 216, and outputs corresponding texnum data 212 and combined texture 220, its intermediate results, along with its final result, textured fragment color 222. In addition, the texture blending function for recirculating texture blender 208 may be disabled. If no textures are enabled, the recirculating texture blender 208 passes the fragment color 218 unchanged to the textured fragment color 222.

In one example, recirculating texture blender 208 is implemented using a single texture environment unit which processes multiple textures by using the texture number and stored state of each texture. Recirculating texture blender 208 will be described in further detail with respect to an example implementation shown in FIG. 5.

2. Multi-State Pipeline

An advantage of the present invention is that one texture processing hardware unit can be used for performing various functions by storing current state information for each texture and processing the textures based on the stored state information. Among other things, the storage of state information and texture number tracking in the present invention means only one texture processing hardware unit needs to be used in raster subsystem 124.

According to an embodiment of the present invention, the fine grain scan converter 204, texture address generator 206, texture filter 207, and recirculating texture blender 208 are all multi-state pipelines. A pipeline is a sequence of connecting hardware units. The multi-state pipeline stores state information for each texture in order to process multiple textures with a single texture unit.

Figure 3:
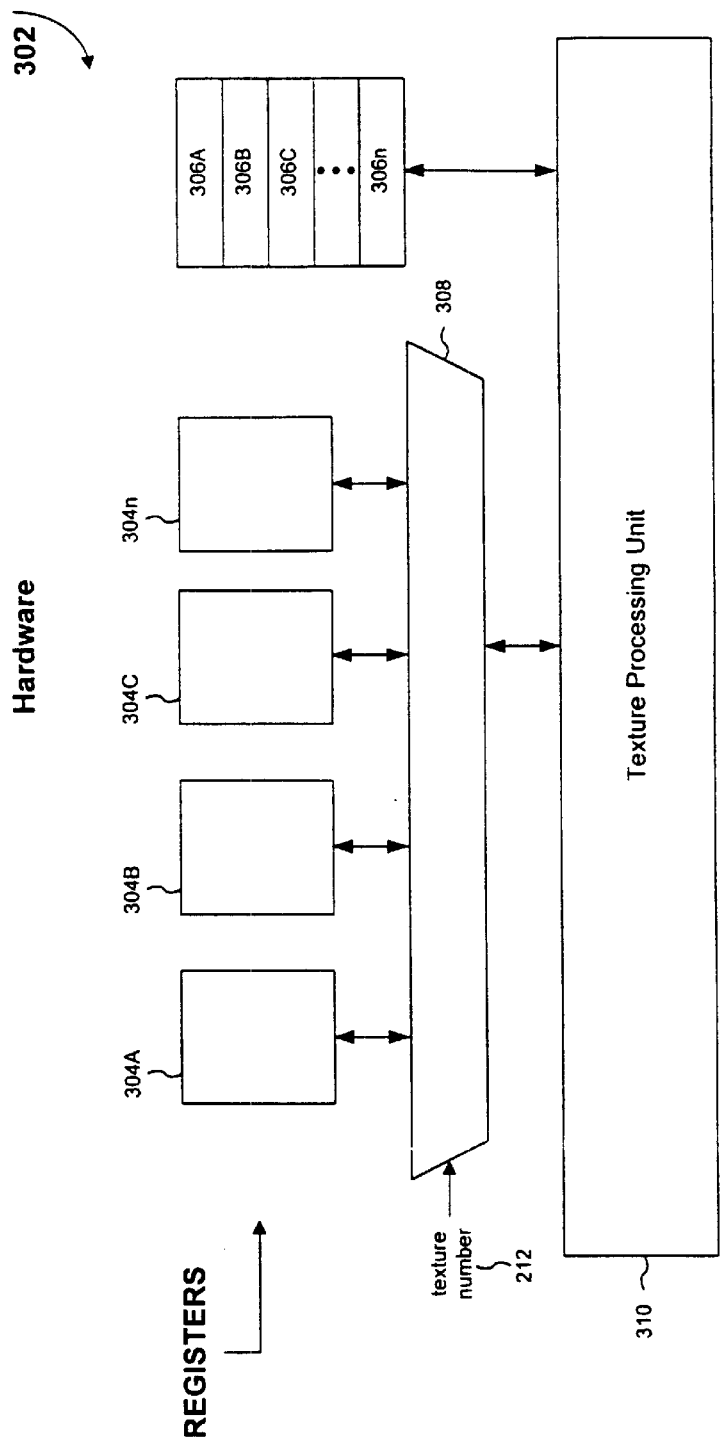
FIG. 3 is a block diagram of a texture processing hardware unit according to one embodiment of the present invention.

Hardware for an example multi-state pipeline according to the present invention is shown in FIG. 3. Hardware 302 includes state registers 304A-n, enablement registers 306A-n, switch/multiplexer 308, and texture processing unit 310. Hardware 302 can be considered on two levels. On one level, this is an abstract of the multi-state nature of the entire texture processing pipeline. On another level, this is a representation of one particular stage in a multi-state texture processing pipeline.

State registers 304 may be implemented as any hardware, software, and/or firmware with the capability to hold the state associated with several textures. State registers 304 are used to track the state of each of the textures during processing. The number of state registers 304 of hardware 302 corresponds to the number of textures that hardware 302 can process at any time. In other words, if hardware 302 is capable of processing four textures, hardware 302 includes at least four state registers to store the state associated with each texture being processed. Corresponding to each of the texture state registers 304A–n is an enablement register 306A, 306B, 306C, . . . 306n. Enablement registers 306 indicate whether a particular texture is enabled. Not all stages of the multi-state texture processing pipeline require enablement registers 306.

Hardware 302 receives texture number 212 from fine grain scan converter 204 and performs texture processing using both texture number 212 and the state information corresponding to texture number 212 that is stored in one of state registers 304. If hardware 302 is processing the first texture, texture number 212 will reflect that the first texture is being processed and hardware 302 will perform processing using state information stored by state register 304A.

Texture processing is performed in stages. Processing during the various stages is performed by one texture unit 310. Texture processing unit 310 may be implemented as any combination of hardware, software, and/or firmware such as a microcomputer, microprocessor central processing unit (CPU), or one or more integrated chips. Texture processing unit 310 is connected to switch/multiplexer 308 to receive texture number 212 or any data in state registers 304. Texture processing unit 310 rapidly switches between processing different textures using the state information stored in texture state registers 304. The texture number 212 controls which texture is selected (and which state registers 304 are selected) by switch/multiplexer 308 for processing during a particular stage. Buffers or other storage devices (not shown) can store data during texture processing.

3. Example Fine Grain Scan Converter

Figure 4:
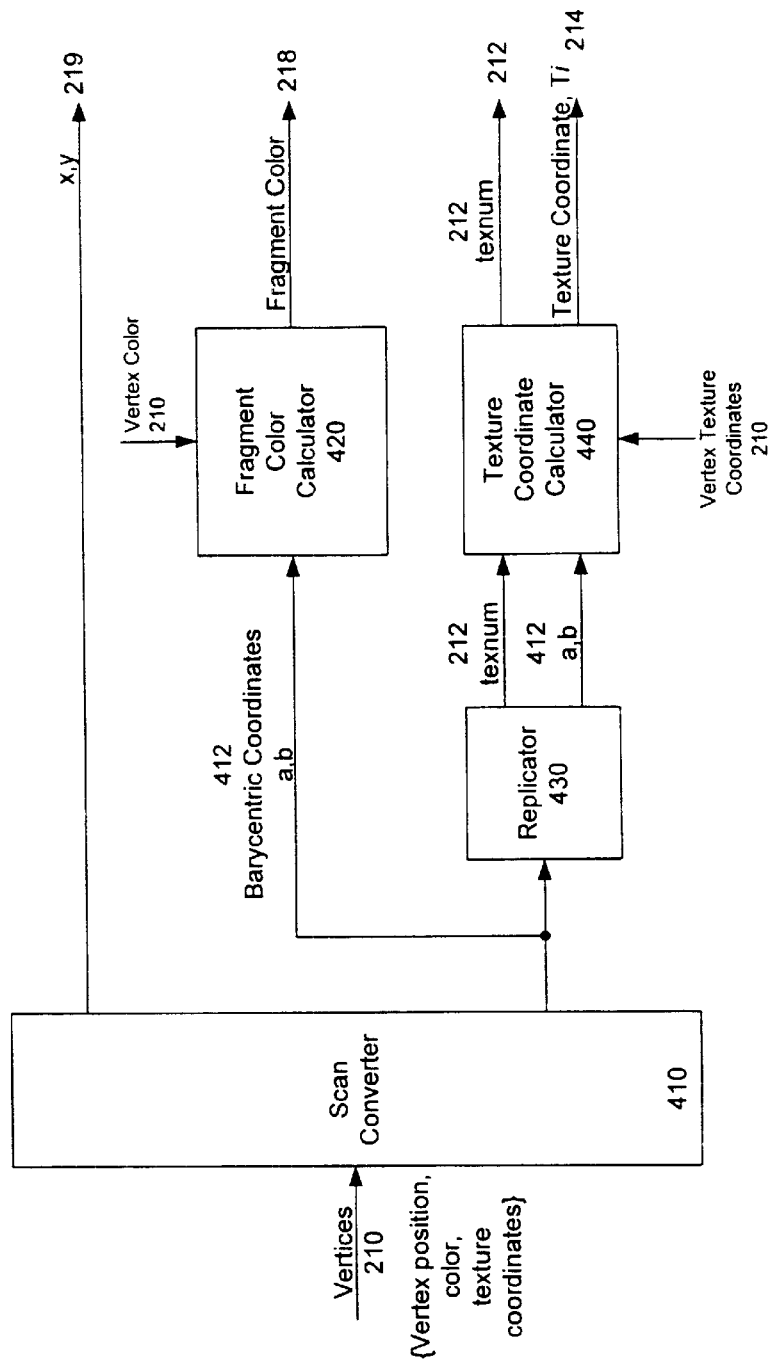
FIG. 4 is a block diagram of a fine grain scan converter according to one embodiment of the present invention.

FIG. 4 shows a fine grain scan converter 204 according to one example of the present invention. Fine grain scan converter 204 includes a scan converter 410, fragment color calculator 420, replicator 430, and texture coordinate calculator 440. One texture identified by texture number 212 is processed by fine grain scan converter 204 in a pipeline stage at a time.

Scan converter 410 takes in a primitive description 210. As described earlier, primitive description 210 can include vertex position, color, and texture coordinates, defined for each vertex. Scan converter 410 produces one position per pixel (called the pixel position or fragment position 219). In one preferred example, fragment position 219 is defined by two coordinates denoted (x,y). Fragment position 219 identifies the picture element (pixel) that will display the resulting image from the fragment being processed.

Scan converter 410 also outputs one position 412 per pixel to fragment color calculator 420 and replicator 430. Position 412 can be any parameter identifying the position of the fragment within the area of a primitive. In one preferred example, position 412 can be position 219 converted to barycentric coordinates (a,b). Fragment color calculator 420 calculates a fragment color 218 on a per pixel basis from the vertex color and the position 412. Replicator 430 makes multiple copies of the pixel position 412. The number of copies corresponds to the number of textures. Replicator 430 assigns each copy a unique texture number 212.

Texture coordinate calculator 440 is coupled to receive output from replicator 430. Texture coordinate calculator 440 receives vertex texture coordinates from primitive description 210 and the texture number (texnum 212) and copy of pixel position 412 output from replicator 430. Texture coordinate calculator 440 calculates texture coordinates 214 in texture space from the vertex texture coordinates and the copy of pixel position 412. Texture coordinate calculator 440 then outputs texnum 212 and the calculated texture coordinates 214 in a fragment for multiple textures to texture address generator 206. In this way, in one preferred example of the present invention, fine grain scan converter 204 produces fragments. Each fragment corresponds to a single pixel and includes fragment color 218 calculated by fragment color calculator 420 and a set of texture coordinates 214 and texture numbers 212 for each of the multiple textures. Each fragment can also include conventional information such as screen position and depth.

Alternative embodiments of the fine grain scan converter according to the present invention are possible as would be apparent to a person skilled in the art given this description. For example, barycentric coordinates can be omitted and other coordinate spaces can be used.

4. Example Recirculating Texture Blender

Figure 5:
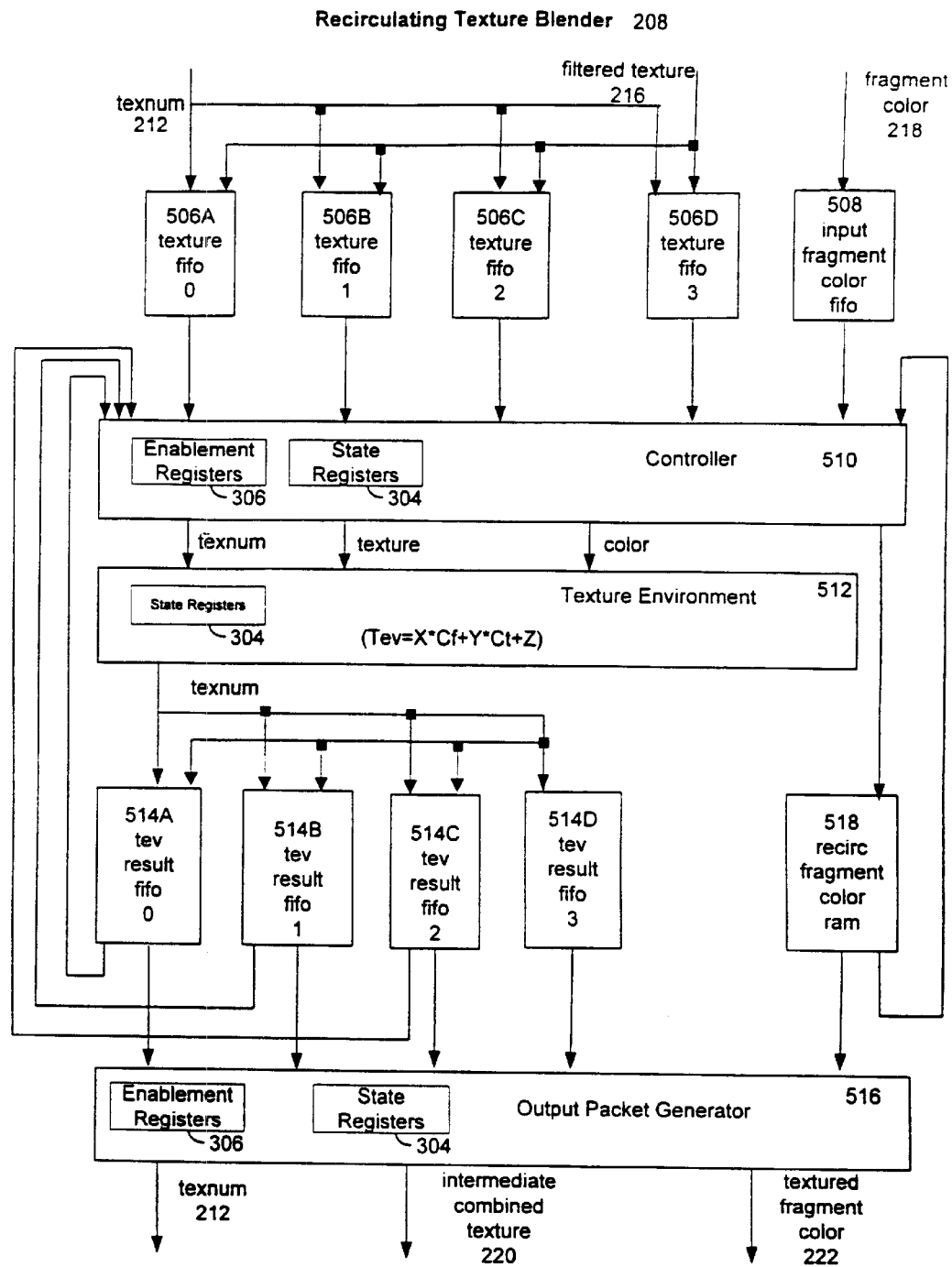
FIG. 5 is a block diagram of a recirculating texture blender according to an embodiment of the present invention.

FIG. 5 is a block diagram of an example recirculating texture blender 208 where up to four textures are rendered. Recirculating texture blender 208 accepts four texture numbers 212 and four multiple filtered texture values 216 output from texture filter 207. Recirculating texture blender 208 combines filtered texture values 216 with fragment color 218 (output from fragment color calculator 420) to produce a final textured fragment color 222. Recirculating texture blender 208 can also output intermediate combined texture 220 representing the intermediate results generated while producing the textured fragment color 222. In the example of four multiple textures, intermediate combined texture 220 can represent two or three combined textures. Texture number information 212 can also pass through the recirculating texture blender 208.

In one embodiment, recirculating texture blender 208 includes texture data buffers or FIFOs 506A–D, controller 510, texture environment 512, results buffers or FIFOs 514A–D, and output packet generator 516. To further combine fragment color, recirculating texture blender 208 includes input fragment color FIFO 508 and recirculating fragment color random access memory (RAM) 518.

Texture FIFO components 506A–D store the multiple filtered texture values 216. Fragment color 218 is stored in input fragment color FIFO 508. Controller 510 is coupled to read out texture FIFOs 506A–D, input fragment color FIFO 508, recirculating fragment color RAM 518, and three intermediate results FIFOs 514A–C. Controller 510 further reads enablement registers 306 and state registers 304. Output from controller 510 is routed to texture environment unit 512. In this way, controller 510 determines what information is sent to texture environment unit 512 in each pass of the fine-grain multi-pass technique of the present invention.

Texture environment 512 combines data using the equation tev=X*Cf+Y*Ct+Z where X, Y, and Z are programmable, Cf is the fragment color or the intermediate result of a preceding texture's texture environment function, and Ct is one of the filtered texture values 216. Outputs from texture environment 512 are coupled to results buffers 514A–D. Results buffers 514A–C store the intermediate results 220 output by texture environment unit 512. These intermediate results 220 represent intermediate combinations of filtered texture and fragment color generated during the fine-grain multi-pass technique. A final textured fragment color 222 representing a combination of all filtered textures 216 (that is, all enabled textures) and fragment color 218 is stored in result buffer 514D.

Output packet generator 516 is coupled to results buffers 514A–D, enablement registers 306, and state registers 304. Output packet generator 516 produces an output packet of the information to be transmitted to frame buffer 128 or to other graphics processing. For example, such an output packet can include texnum 212, intermediate combined texture 220, and/or textured fragment color 222.

The operation of the raster subsystem 124 in each pass of a fine-grain multi-pass technique for multiple texture rendering according to the present invention is described further below with respect to the flowchart diagram of FIGS. 6A–8D.

Buffers are implemented in any type of computer storage medium. Any computer storage medium and/or memory may be used including microcomputer, application specific integrated chip memory, other hardware computer chips, short-term or long-term memory, removable memory such as compact disk (CD), floppy disk, or any other medium capable of storing computer data. In one embodiment of the present invention, buffers are implemented using first in first out (FIFO) memory. FIFO memory outputs data from the memory device in the order received. In other words, the first data element received and stored in FIFO memory is the first data element output when a command is received to send data from the FIFO memory.

B. Operation

Figure 6A:
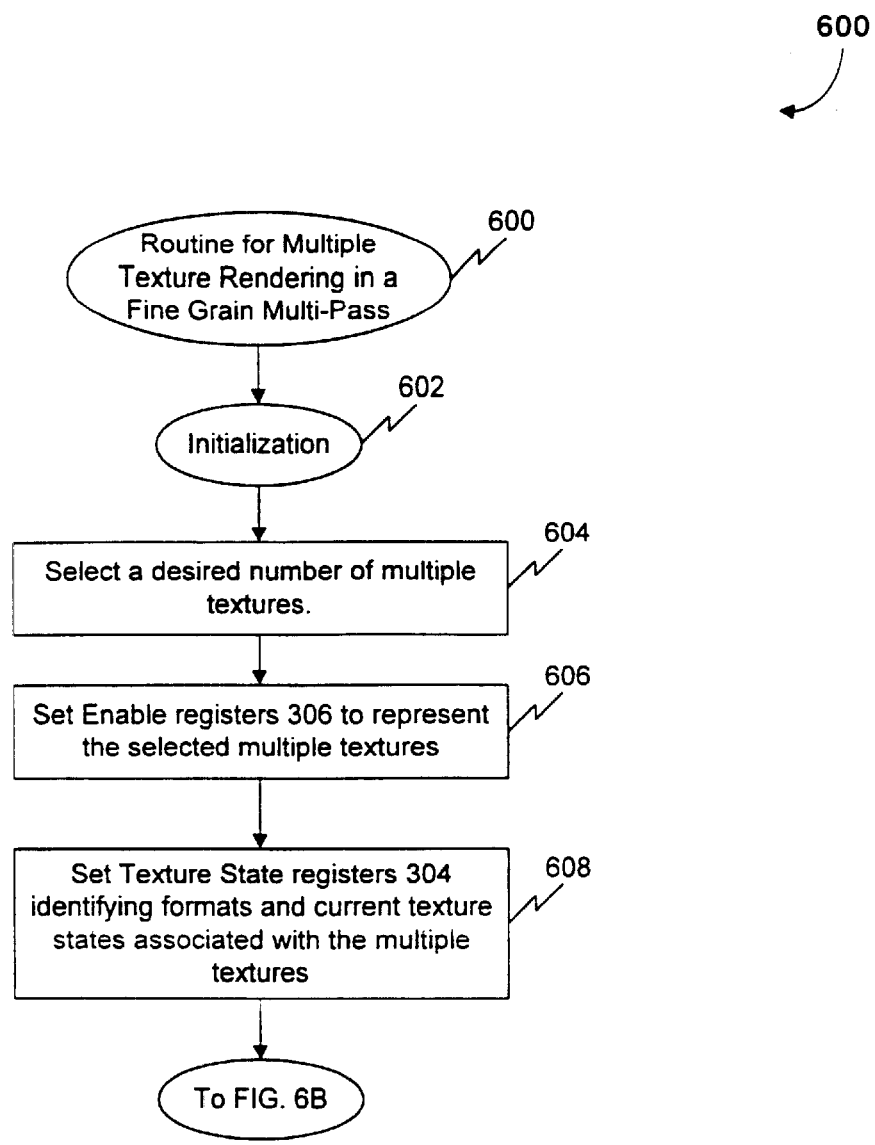
FIGS. 6A, 6B, 7, 8A, 8B, 8C, and 8D illustrate a flowchart of a routine for rendering multiple textures on a primitive according to one embodiment of the present invention.
Figure 6B:
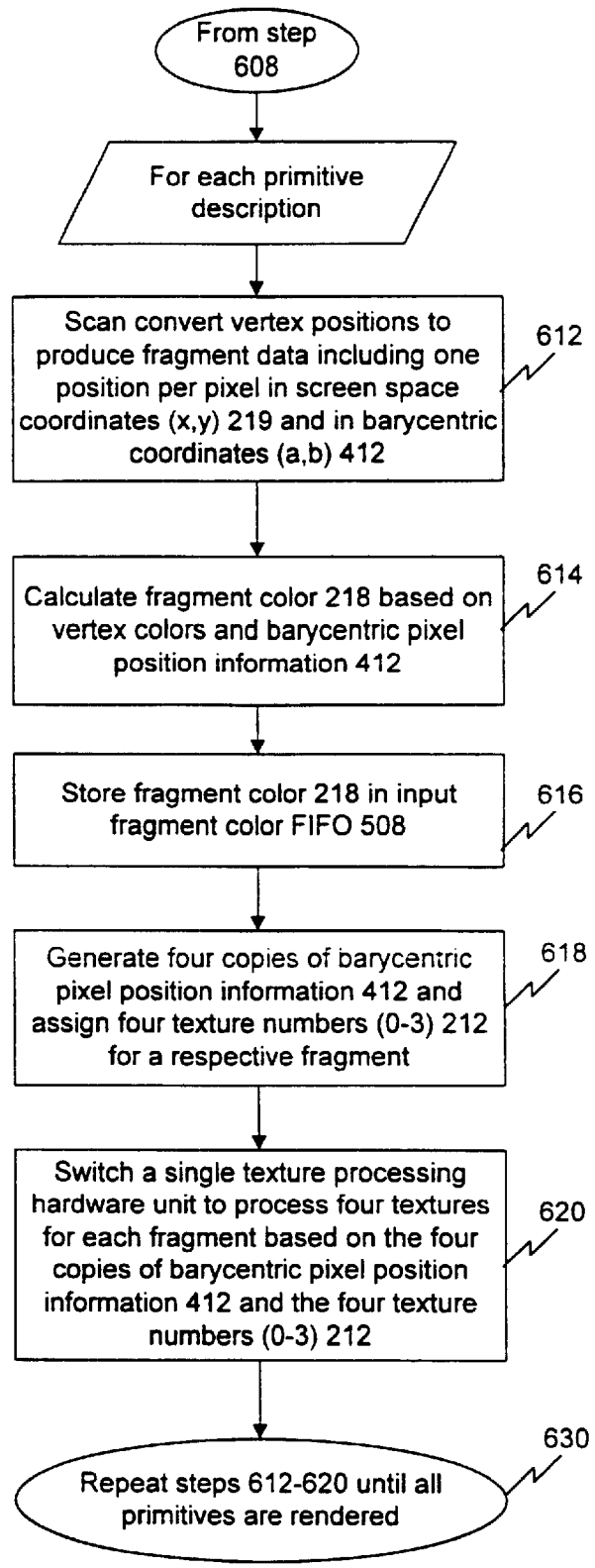
Figure 7:
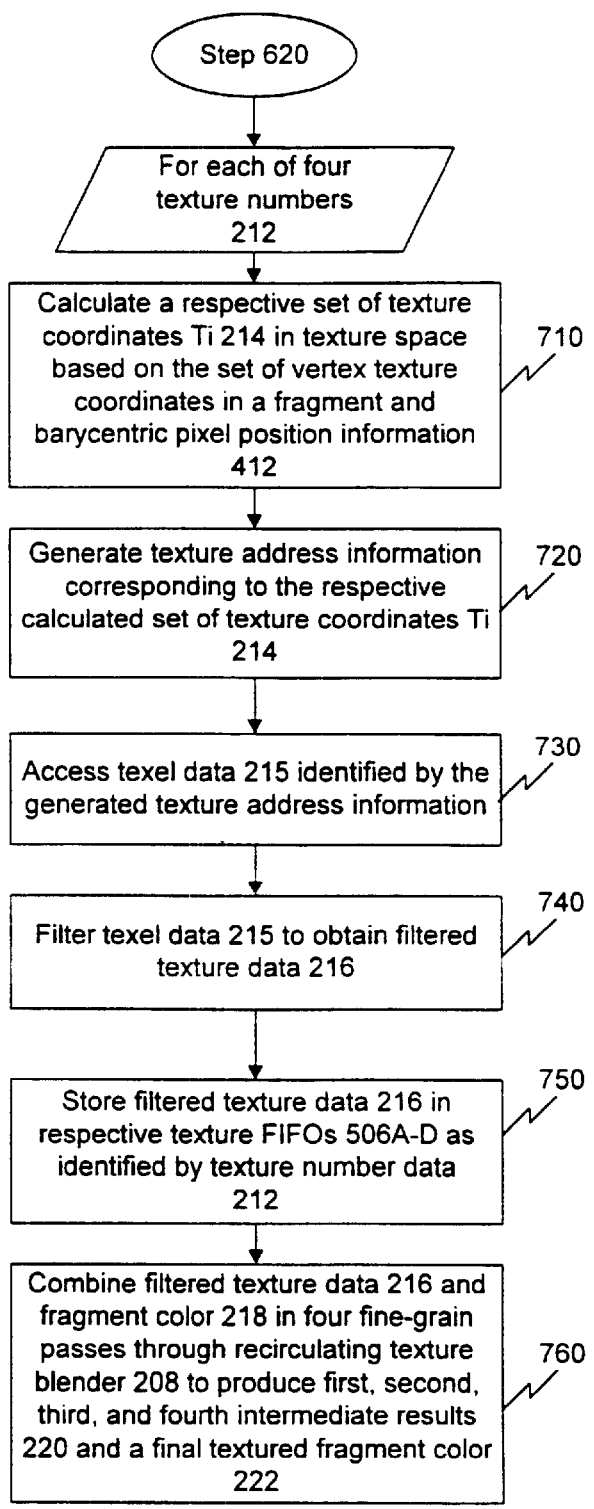

The operation of the fine grain multi-pass multiple texture rendering embodiment of FIGS. 1–5 is described further with respect to an example routine 600 shown in a flowchart in FIGS. 6A–8D. For clarity, routine 600 is described with respect to rendering four multiple textures on a single primitive. In general, as would be apparent to a person skilled in the art given this description, a greater or smaller of number of textures can be rendered according to the present invention. FIGS. 6A and 6B show the overall steps in routine 600 (steps 602–630). FIG. 7 shows texture processing step 620 in further detail (steps 710–760). FIGS. 8A–8D show step 760 in further detail. In particular, FIGS. 8A–8D show four respective fine-grain passes made in recirculating texture blending according to an example of the present invention.

C. Initialization

As shown in FIG. 6A, an initialization stage 602 includes steps 604 to 608. In step 604, a desired number of enabled textures (e.g., 4) is selected by a user through a user-interface (e.g., keyboard 110 or cursor controller 112) or set to a default. In step 606, four enablement registers 306A–D are set to represent four enabled textures. In step 608, texture state registers 304 are set to identify formats and current texture states associated with the multiple textures.

D. Multiple Texture Rendering on a Single Primitive

FIG. 6B shows steps for multiple texture rendering on a single primitive according to the present invention (steps 612–630). In step 612, scan converter 410 receives a description of a primitive 210. As described above, the primitive description 210 can include vertex position, color, and a set of vertex texture coordinates. Scan converter 410 scan converts vertex positions of the primitive to produce fragment data. The fragment data includes one position per pixel in screen space coordinates (x,y) 219 and in barycentric coordinates (a, b) 412. In steps 614, fragment color calculator 420 calculates fragment color 218 based on vertex colors of the primitive description 210 and barycentric pixel position information 412 output from scan converter 410. Fragment color 218 is stored in input fragment color FIFO 508 (step 616). In this way, scan converter 410 outputs data referred to herein as a fragment or fragment data.

Replicator 430 generates four copies of barycentric pixel information 412 and assigns four texture numbers 212 for a respective fragment (step 618). For example, the four assigned texture numbers 212 can be numbers 0, 1, 2, and 3. Texture numbers 212 (also called texnum 212) are used to identify the particular textures being processed and to control switch 308.

In step 620, a single texture processing unit 302 is switched to process four textures for each fragment based on the four copies of barycentric pixel position information 412 and the four texture numbers 212. Step 620 is described in further detail with respect to FIG. 7. Steps 612–620 are then repeated for each primitive until all primitives are rendered (step 630).

E. Texture Processing

As shown in FIG. 7, texture processing steps 710–760 are carried out for each of the enabled four textured numbers 212. Texture coordinate calculator 440 calculates a respective set of texture coordinates 214 in texture space based on the set of vertex texture coordinates that are fragment and barycentric pixel position information 412. Step 710 is repeated for each of the texture numbers to create four sets of textured coordinates $T_0$, $T_1$, $T_2$, and $T_3$.

In step 720, texture address information is generated corresponding to the respective calculated sets of texture coordinates $T_i$. For example, texture address information corresponding to the calculated texture coordinates set $T_0$ generated for texnum 0. In step 730, texture address generator 206 accesses texel data 215 identified by the generated texture address information. For example, for $T_0$ texel data 215 is accessed from the first texture corresponding to texnum 0. Texture address generator 206 repeats steps 720 and 730 for each of the enabled other texture numbers 1, 2, and 3.

In step 740, texel data 215 is filtered to obtain filtered texture data 216. Texture filter 207 filters texel data 215 for each of the multiple textures to obtain four filtered texture data values 216. (Step 740). In step 750, the filtered textured data 216 is stored in respective texture FIFOs 506A–D, as identified by the texture number data 212.

Each of the above steps 710–750 can be carried out by texture processing unit 310. A texture number 212 of one of the four textures 0–3 is sent to switch 308. Switch 308 then couples the texture processing unit 310 with state registers 304 which correspond to the texture identified by the received texture number 212. Texture processing unit then proceeds to carry out the operations of texture coordinate calculator 440, texture address generator 206 and texture filter 207 as described above with respects to steps 710–750.

1. Recirculating Texture Blending

Finally, in step 760 filtered texture data 216 and fragment color 218 are combined in four fine grain passes through recirculating texture blender 208. This produces first, second, third, and fourth intermediate results 220 and the final textured fragment color 222 (step 760). Step 760 is described in further detail with the respect to FIGS. 8A through 8D. FIGS. 8A through 8D show the four fine grain passes carried out by recirculating texture blender 208 according to step 760.

In one example, step 760 can be carried out by texture processing unit 310. Texture processing unit 310 then proceeds to carry out the operations of recirculating texture blender 208 as described herein.

a. Fine Grain Pass One

Figure 8A:
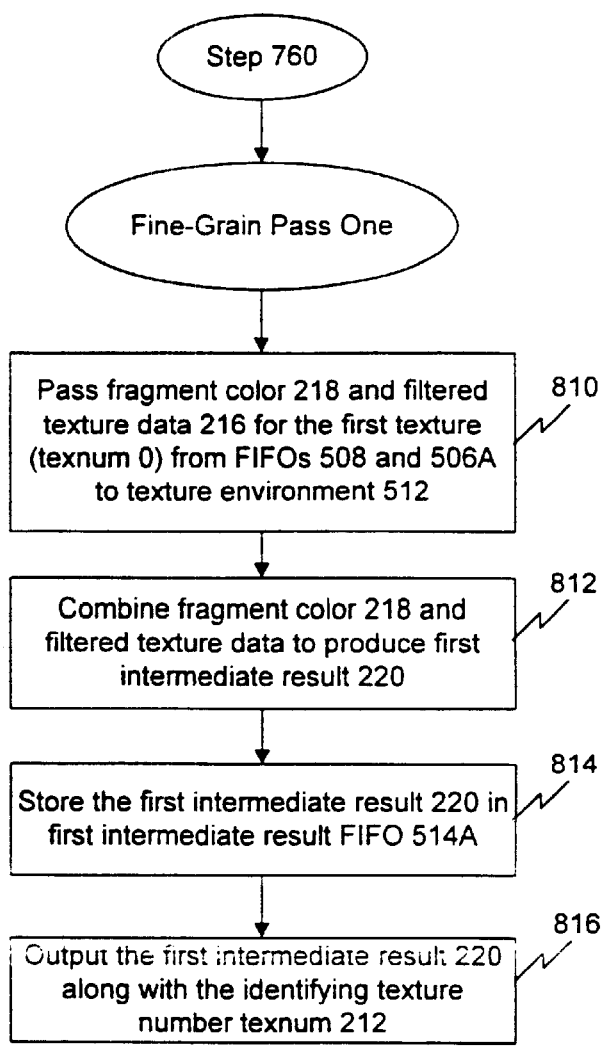

FIG. 8A shows fine grain pass one (steps 810 through 816). In step 810, fragment color 218 and filtered texture data 216 for the first texture (texnum 0) is passed from FIFOs 508 and 506A to texture environment 512 by controller 510. Texture environment 512 combines fragment color 218 and filtered textured data 216 passed in step 810 to produce first intermediate result 220 (step 812). As described further below, fragment color 218 and filtered textured data 216 are combined according to the equation tev=X*Cf+Y*Ct+Z where X, Y, and Z are programmable. Cf is the fragment color 218 in fine grain pass one and Ct is the filtered texture data 216 or texture color in fine grain pass one. Texture environment 512 reads information and state registers 304A to obtain necessary texture state information. In one example implementation not intended to limit the present invention, texture environment 512 combines textures according to the above equation using replace, modulate, decal, blend, and/or add functions of the graphics application programming language OPENGL licensed by Silicon Graphics Inc.

The first intermediate result 220 output by texture environment 512 is stored in first intermediate result FIFO 514A (step 814). The first intermediate result 220 along with identifying texture number 212 is output by output packet generator 516 (step 816). Step 816 is optional depending on the desired output of a particular application.

b. Fine Grain Pass Two

Figure 8B:
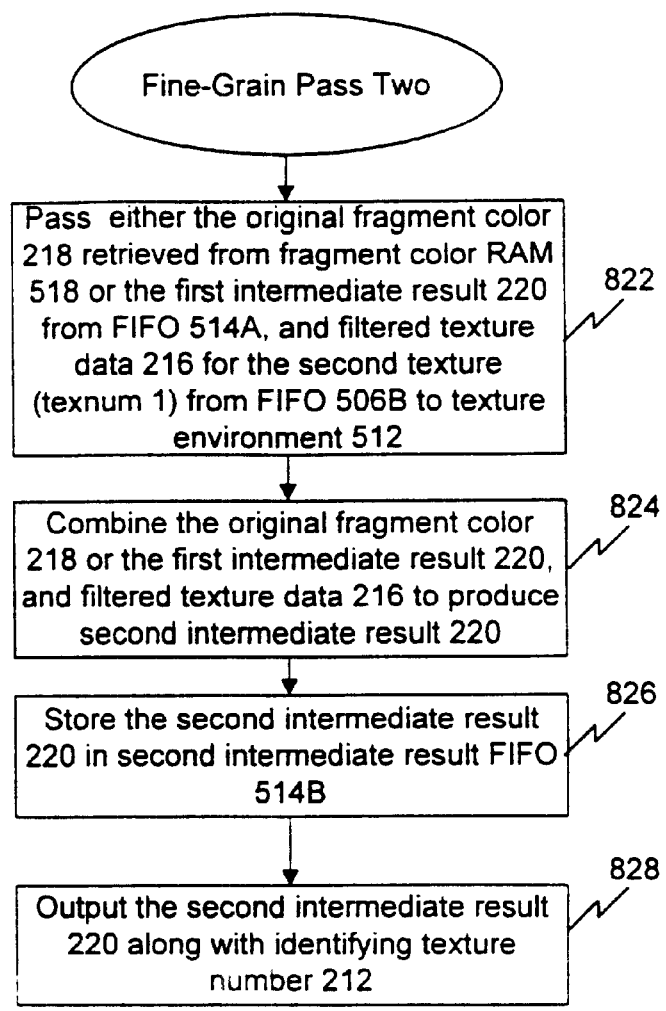

FIG. 8B shows the operation of recirculating texture blender 208 during fine grain pass two (steps 822 through 828). In step 822, either the original fragment color 218 retrieved from fragment color RAM 518, or the first intermediate result 220 stored in first intermediate result FIFO 514A is passed to texture environment 512. Filtered texture data 216 for the second texture (texnum 1) is also passed from FIFO 506B to texture environment 512.

Texture environment 512 then combines the fragment color 218 or the first intermediate result 220 with the filtered texture data 216 for the second texture to produce second intermediate result 220 (step 824). Like described previously with respect to step 814, texture environment 512 combines fragment color 218 or first intermediate result 220 and filtered texture data 216 according to the texture environment equation tev=X*Cf+Y*Ct+Z where X, Y, and Z are programmable. In step 824 Cf is the first intermediate result 220 or fragment color 218. The parameter Ct is the filtered texture data 216 for the second texture in texnum 1 instead of the first texture as described in step 814. Otherwise, the operation of texture environment 512 proceeds as described before and as described in further detail below with respect to an example implementation. Texture environment 512 then outputs the second intermediate result 220 for storage in second intermediate result FIFO 514B (step 826).

In step 828, output packet generator 516 outputs the second intermediate result 220. Texture number 212 identifying texnum 1 is also output (Step 828).

c. Fine Grain Pass Three

Figure 8C:
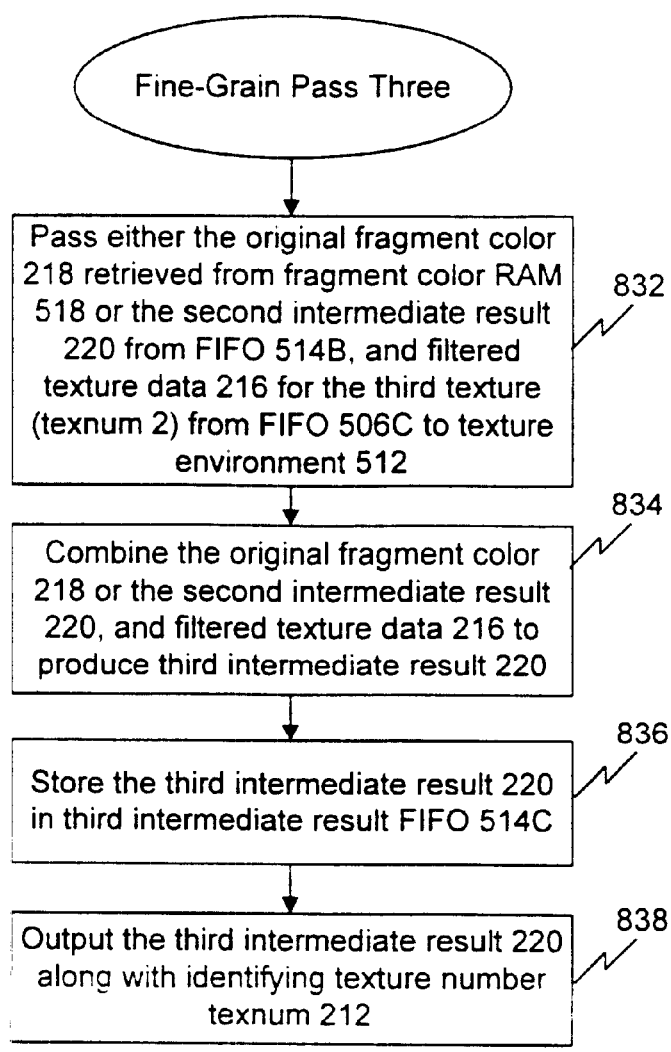

As shown in FIG. 8C, fine grain pass three is similar to the operation described previously with respect to fine grain pass two except that the second intermediate result 220 from fine grain pass two or the fragment color 218, are combined with the filtered texture data for the third texture (texnum 2) by recirculating texture blender 208. In step 832, second intermediate result 220 and filtered texture data 216 for the third texture are passed from FIFOs 514B and 506C to texture environment 512. Alternatively, fragment color 218 can be passed instead of passing second intermediate result 220. Texture environment 512 combines the second intermediate result 220 (or fragment color 218) and filtered texture data 216 passed in step 832 to produce a third intermediate result 220 (step 834). Such combining proceeds according to the equation described previously with respect to step 824.

The third intermediate result 220 output from texture environment 512 is then stored in third intermediate result FIFO 514C (step 836). Output packet generator 516 can then output third intermediate result 220 and identifying texture number 212 (e.g., texnum 2) as desired (step 838).

d. Fine Grain Pass Four

Figure 8D:
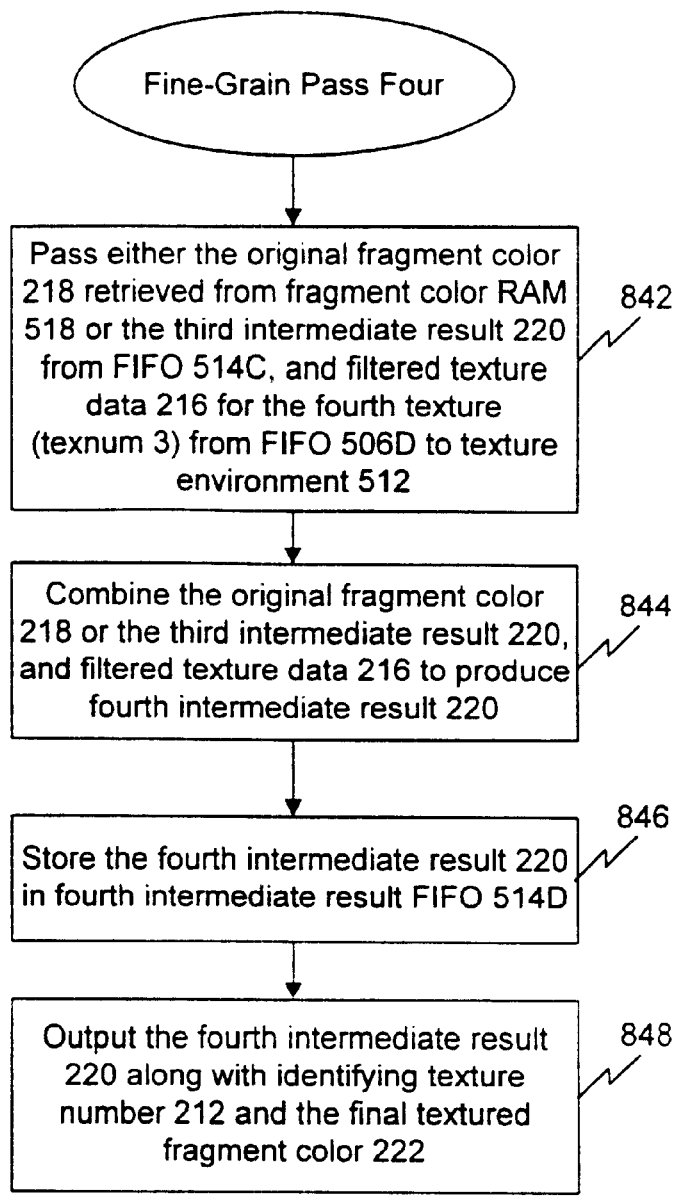

As shown in FIG. 8D, the operation of recirculating texture blender 208 and fine grain pass four is similar to that described with respect to fine grain passes two and three above except that a third intermediate result 220 generated in fine grain pass three and filtered texture data for the fourth texture are combined. In step 842 then the third intermediate result 220 and filtered texture data 216 for the fourth texture (texnum 3) are passed from FIFOs 514C and 506D to texture environment 512. Alternatively, fragment color 218 from RAM 518 can be passed instead of passing third intermediate result 220. Texture environment 512 then combines the third intermediate result 220 (or fragment color 218) and filtered texture data 216 passed in step 842 to produce a fourth intermediate result 220 (step 844). Such combination by the texture environment 512 proceeds according to the texture environment equation described previously with respect to steps 824 and 834. Texture environment 512 then outputs the fourth intermediate result 220 representing a final texture fragment color 222 for storage in FIFO 514D (step 846). Output packet generator 516 then outputs the fourth intermediate result 220 along with identifying texture number 212 (e.g., texnum 3) (step 848). Fourth intermediate result 220 is also output as the final textured fragment color 222 (Step 848).

Steps 818, 828, 838, and 848 are each optional. Output-packet generator 516 can output none or any one or all of the intermediate results generated depending on a particular output desired by a user or application.

F. Example Implementation

One example implementation representing an extension to OPENGL is described below; however, the present invention is not intended to be necessarily limited to this implementation. In this example, recirculating texture blender 208 performs the following functions: flow control of incoming textures, texture environment of one or multiple textures (e.g., 4 textures), and flow control of combined textures.

a. Texture Input Flow Control

Recirculating texture blender 208 receives filtered textures 216 and texture numbers 212 from the texture filter 207. The incoming textures are routed to one of four FIFOs 506A–D. They are separated this way to allow recirculation for multiple active textures.

b. Multiple Textures

Multiple textures are applied sequentially. Enablement registers 306 (e.g., tex_N_en registers) define which of up to four textures are active. State registers 304 (e.g., tex_N_format and tex_N_env registers) define how the textures are applied to the fragment color. State registers 304 (tex_N_tev_sel registers) also specify how the outputs are routed since a chain of Texture Environments may be broken when one or more of the textures is used to drive a lighting or fog parameter.

c. Texture Environment

Texture Environment Unit 512 applies textures to the fragment colors as defined by the Texture Environment Specification and the Texture Environment Addition Extension. When enabled, the Texture Environment Unit 512 performs the functions specified by tex_N_env registers. The functions used by OPENGL are REPLACE, MODULATE, DECAL, BLEND, and ADD functions. The constant colors are specified by the tex_N_const registers. For the ADD function, the bias colors are specified by the tex_N_bias registers. See, e.g., OPENGL Programming Guide: The Official Guide to Learning OpenGL, Beider et al. (OpenGL Architecture Review Board: Addison-Wesley: Reading, Mass. 1993), (incorporated herein by reference).

Texture Environment functions are applied differently depending on the internal storage formats of the textures, which are specified in the tex_N_format registers. All texture environment functions are of the form $$Cv = X*Cf + Y*Ct + Z$$

where the values of X, Y, and Z are chosen based on texture format and texture environment function. The values of X, Y, and Z are as shown in the following table.

| Function | Equation | X | Y | Z |
|---|---|---|---|---|
| disabled | Cv = Cf | 1 | 0 | 0 |
| replace | Cv = Ct | 0 | 1 | 0 |
| modulate | Cv = CtCf | Ct | 0 | 0 |
| decal | Cv = AtCf + AtCt + Cf | −At | At | Cf |
| blend | Cv = CtCf + CcCt + Cf | −Ct | Cc | Cf |
| add | Cv = Cf + CcCt + Cb | 1 | Cc | Cb | d. Programming Note

Each active texture has its own state vector which includes texture image and filtering parameters and texture environment application.

The texture environments are applied in a pipelined fashion whereby the output of one texture environment is used as the input fragment color for the texture environment for the next active texture. Changes to texture state other than texture coordinates are routed through a switch 308 which controls which instance of texture state is affected.

Texture coordinate set, texture coordinate evaluator state, texture generation function, and texture matrix are replicated independently of the texture rasterization state and may differ in number from the number of textures which can be active during rasterization. Post-transform texture coordinates sets are associated with a texture rasterization unit by binding them to a texture environment and they may be multicast to several texture rasterization units.

This example is described using four active textures and four sets of texture coordinates though the actual number supported is implementation dependent and can be larger or smaller than four.

Texturing maps a portion of one or more specified images onto each primitive for which texturing is enabled. This mapping is accomplished by using the color of an image at the location indicated by a fragment's (s, t, r) coordinates to modify the fragment's RGBA color. An implementation may support texturing using more than one image at a time. In this case the fragment carries multiple sets of texture coordinates (s, t, r) which are used to index separate images to produce color values which are collectively used to modify the fragment's RGBA color. Texturing is specified only for RGBA mode; its use in color index mode is undefined.

OPENGL provides a means to specify the details of how texturing of a primitive is effected. These details include specifications of the image to be texture mapped, the means by which the image is filtered when applied to the primitive, and the function that determines what RGBA value is produced given a fragment color and an image value.

Example environment parameters are TEXTURE_ENV_MODE, TEXTURE_ENV_COLOR, and TEXTURE_ENV_COORD_SET_SGIS. TEXTURE_ENV_MODE may be set to one of REPLACE, MODULATE, DECAL, or BLEND; TEXTURE_ENV_COLOR is set to an RGBA color by providing four single-precision floating-point values in the range [0, 1] (values outside this range are clamped to it). If integers are provided for TEXTURE_ENV_COLOR, then they are converted to floating-point. TEXTURE_ENV_COORD_SET_SGIS may be set to one of TEXTURE0_SGIS . . . TEXTURE<n>_SGIS where <n> is one less than the number of supported texture coordinate sets. If a floating-point value is provided, then it is rounded to the nearest integer.

The value of TEXTURE_ENV_COORD_SET_SGIS specifies which set of fragment texture coordinates are used to determine the texture value used in the texture function. The same set of texture coordinates may be simultaneously used by multiple textures.

The state required for the current texture environment consists of the four-valued integer indicating the texture function, four floating-point TEXTURE_ENV_COLOR values, and one MAX_TEXTURE_COORD_SETS_SGIS-valued integer indicating the texture coordinate set binding. In the initial state, the texture function is given by MODULATE, TEXTURE_ENV_COLOR is (0, 0, 0, 0), and texture coordinate set is TEXTURE0_SGIS.

Texturing is enabled or disabled using the generic Enable and Disable commands, respectively, with the symbolic constant TEXTURE_1D or TEXTURE_2D to enable the one-dimensional or two-dimensional texture, respectively. If both the one- and two-dimensional textures are enabled, the two-dimensional texture is used. If all texturing is disabled, a rasterized fragment is passed unaltered to the next stage of the GL (although its texture coordinates may be discarded). Otherwise, a texture value is found according to the parameter values of the currently bound texture image of the appropriate dimensionality using the rules given. This texture value is used along with the incoming fragment in computing the texture function indicated by the currently bound texture environment. The result of this function replaces the incoming fragment's R, G, B, and A values. These are the color values passed to subsequent operations. Other data associated with the incoming fragment remain unchanged, except that the texture coordinates may be discarded.

When multiple textures are supported, additional textures are each paired with an environment function. The second texture function is computed by Texture Environment Unit 512 in response to controller 510 using the texture value from the second texture, the fragment resulting from the first texture function computation and the environment function currently bound to the second texture. If there is a third texture, the fragment resulting from the second texture function is combined with the third texture value using the environment function bound to the third texture and so on. Texturing is enabled and disabled individually for each texture. If texturing is disabled for one of the textures, then the fragment result from the previous stage is passed unaltered to the next stage.

V. Conclusion

While specific embodiments of the present invention have been described above, it should be understood that they have been presented by way of example only, and not limitation. For example, the present invention can be implemented as an extension to OPENGL, but is not intended to be limited to an OPENGL implementation or environment. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer graphics raster subsystem for rendering multiple textures on a primitive, comprising:
   a fine grain scan converter that receives a primitive description with one color and multiple sets of texture coordinates defined for each vertex, and outputs a fragment including a fragment color and the sets of texture coordinates for each of the respective multiple textures along with identifying texture numbers;
   a texture address generator coupled to said fine grain scan converter, said texture address generator accesses texels at said texture coordinates in texture maps identified by the texture numbers;
   a texture filter that filters the texels accessed by the texture address generator to produce a filtered texture value for each texture identified by the respective texture numbers; and
   a recirculating texture blender that combines in multiple fine grain passes at least one of the fragment color and respective filtered texture values of the multiple textures to generate a final textured fragment color.

2. The system of claim 1, wherein said fine grain scan converter includes a scan converter, a replicator, a fragment color calculator, and a texture coordinate calculator.

3. The system of claim 2, wherein said recirculating texture blender includes a controller coupled to a texture environment unit.

4. The system of claim 2, wherein each of said texture coordinate calculator in said fine grain scan converter, said texture address generator, said texture filter, and said recirculating texture blender comprise stages of a single texture processing hardware unit.

5. The system of claim 3, wherein each of said texture coordinate calculator in said fine grain scan converter, said texture address generator, said texture filter, and said recirculating texture blender comprise stages of a single texture processing hardware unit.

6. The system of claim 5, wherein said single texture processing hardware unit includes:
   a texture processing unit the performs said stages of texture processing;
   a texture state register for storing state information associated with each of said multiple textures during said texture processing;
   a texture enablement register for storing information identifying whether each of said multiple textures is enabled; and
   a switch for selecting which texture is to be processed by said texture processing unit based on a received texture number.

7. The system of claim 1, wherein said recirculating texture blender includes a controller coupled to a texture environment unit.

8. A method for fine grain multi-pass for rendering multiple textures on a primitive in a fine grain multi-pass at pixel level, comprising the steps of:
   a. storing state information associated with each of said multiple textures in texture state registers;
   b. storing enabled information in texture enablement registers identifying whether each of said multiple textures is enabled;
   c. assigning texture numbers identifying textures;
   d. at stages of multiple texture rendering, switching a texture processing unit to couple a texture processing unit to a texture state register corresponding to a texture identified by a texture number received in said step (c); and
   e. processing each texture based on state information in the texture state register when the texture enablement register identifies an enabled texture; wherein steps (d) and (e) are repeated until all of the assigned texture numbers in step (c) have been received and all enabled textures have been processed in rendering the primitive.

9. A computer graphics raster subsystem for rendering multiple textures on a primitive, comprising:
   means for converting a primitive description with one color and multiple sets of texture coordinates defined for each vertex into a fragment including a fragment color and the sets of texture coordinates for each of the respective multiple textures along with identifying texture numbers;
   means for accessing texels at said texture coordinates in texture maps identified by the texture numbers coupled to said means for converting a primitive description with one color and multiple sets of texture coordinates defined for each vertex into a fragment including a fragment color and the sets of texture coordinates for each of the respective multiple textures along with identifying texture numbers;
   means for producing a filtered texture value for each texture identified by the respective texture numbers for the texels accessed by said means for accessing texels at said texture coordinates in texture maps identified by the texture numbers; and
   means for combining in multiple fine grain passes at least one of the fragment color and respective filtered texture values of the multiple textures into a final textured fragment color.

10. The system of claim 9, wherein said primitive converting means includes means for scan converting, means for replicating, means for calculating a fragment color, and means for calculating texture coordinates.

11. The system of claim 10, wherein said means for calculating texture coordinates in said primitive converting means, said means for accessing texels at said texture coordinates in texture maps identified by the texture numbers, said means for producing a filtered texture value for each texture identified by the respective texture numbers for the texels accessed by said means for accessing texels at said texture coordinates in texture maps identified by the texture numbers, and said means for combining at least one of the fragment color and respective filtered texture values of the multiple textures into a final textured color comprise stages of means for processing textures.

12. The system of claim 11, wherein said means for processing textures includes:
   means for performing said stages of texture processing;
   means for storing state information associated with each of said multiple textures during said stages of texture processing;
   means for storing information identifying whether each of said multiple textures is enabled; and
   means for selecting which texture is to be processed by said texture processing unit based on a received texture number.

13. A method for fine grain scan conversion in rendering multiple textures on a primitive, comprising the steps of:
   converting vertex position for each vertex of the primitive into a pixel position;
   calculating fragment color from said pixel position and vertex color of the primitive;
   assigning texture numbers identifying the multiple textures;
   replicating said pixel position once for each texture;
   coupling one texture number with each copy of said pixel position; and
   calculating texture coordinates for each texture number from the coupled copy of said pixel position and vertex texture coordinates of the primitive.

14. The method of claim 13, wherein said pixel position comprises barycentric coordinates.

15. A method for multiple texture rendering in a fine grain multi-pass, comprising the steps of:
   selecting a number of multiple textures;
   setting enablement registers to represent said selected number of multiple textures;
   setting texture state registers to identify formats and current texture states associated with said multiple textures; and
   performing multiple texture rendering for each primitive, comprising the steps of:
      scan converting vertex positions of said primitive to produce a pixel position;
      calculating a fragment color based on vertex colors of said primitive and the pixel position produced by said scan conversion;
      storing said fragment color;
      generating one copy of the pixel position for each of said multiple textures;
      assigning one copy of the pixel position and a texture number to each of said multiple textures; and
      switching a single texture processing hardware unit to process each of said multiple textures for each fragment based on the assigned copy of said pixel position and said assigned texture number.

16. The method of claim 15, wherein said pixel position is represented in barycentric coordinates.

17. The method of claim 16, wherein said step of switching a single texture processing hardware unit to process each of said multiple textures comprises the steps of:
   calculating a respective set of texture coordinates in texture space based on a set of vertex texture coordinates in a fragment and said pixel position;
   generating texture address information corresponding to said respective calculated set of vertex texture coordinates;
   accessing texel data identified by the generated texture address information;
   filtering texel data;
   storing said filtered texel data in a FIFO identified by said assigned texture number; and
   combining said filtered texture data and said fragment color in multiple fine grain passes through a recirculating texture blender.

18. The method of claim 17, wherein said step of combining said filtered texture data and said fragment color comprises four fine grain passes through said recirculating texture blender.

19. The method of claim 18, wherein a first fine grain pass through said recirculating texture blender comprises the steps of:
   storing said fragment color in a fragment color RAM;
   passing said filtered texture data and said fragment color for a first texture from FIFOs to a texture environment;
   combining said filtered texture data and said fragment color to produce a first intermediate result;
   storing said first intermediate result in a first intermediate result FIFO; and
   outputting said first intermediate result and the assigned texture number.

20. The method of claim 18, wherein a second fine grain pass through said recirculating texture blender comprises the steps of:
   passing said filtered texture data for a second texture from a FIFO to a texture environment;
   selecting a fragment color value from said fragment color stored in a fragment color RAM and a first intermediate result stored in a first intermediate result FIFO;
   combining said filtered texture data and said selected fragment color to produce a second intermediate result;
   storing said second intermediate result in a second intermediate result FIFO; and
   outputting said second intermediate result and the assigned texture number.

21. The method of claim 18, wherein said a fine grain pass through said recirculating texture blender comprises the steps of:
   passing said filtered texture data for a third texture from a FIFO to a texture environment;
   selecting a fragment color value from said fragment color stored in a fragment color RAM and a second intermediate result stored in a first intermediate result FIFO;
   combining said filtered texture data and said selected fragment color to produce a third intermediate result;
   storing said third intermediate result in a third intermediate result FIFO; and
   outputting said third intermediate result and the assigned texture number.

22. The method of claim 18, wherein a fourth fine grain pass through said recirculating texture blender comprises the steps of:
   passing said filtered texture data for a fourth texture from a FIFO to a texture environment;
   selecting a fragment color value from said fragment color stored in a fragment color RAM and a third intermediate result stored in a first intermediate result FIFO;

combining said filtered texture data and said selected fragment color to produce a fourth intermediate result;

storing said fourth intermediate result in a fourth intermediate result FIFO; and outputting said fourth intermediate result and the assigned texture number.

* * * * *

UNITED STATES PATENT AND TRADEMARK OFFICE
CERTIFICATE OF CORRECTION

PATENT NO. : 6,392,655 B1
DATED : May 21, 2002
INVENTOR(S) : Migdal et al.

It is certified that error appears in the above-identified patent and that said Letters Patent is hereby corrected as shown below:

<u>Column 17,</u>
Line 63, delete the word "the" and insert therefor -- that --.

<u>Column 20,</u>
Line 45, delete the word "a" and insert therefor -- third --.

Signed and Sealed this

Twenty-seventh Day of January, 2004

JON W. DUDAS
*Acting Director of the United States Patent and Trademark Office*